United States Patent [19]

Krausse et al.

[11] Patent Number: 5,563,972
[45] Date of Patent: Oct. 8, 1996

[54] RADIO FREQUENCY SHIELDING ARRANGEMENT FOR A PLUG WHICH HAS A LIGHT GUIDE AND CAN BE CONNECTED TO A MODULE FRAME

[75] Inventors: Peter Krausse, Aschheim; Erich Thalhammer, München, both of Germany

[73] Assignee: Siemens Aktiengesellschaft, Munich, Germany

[21] Appl. No.: 446,661

[22] PCT Filed: Nov. 11, 1993

[86] PCT No.: PCT/EP93/03168

§ 371 Date: May 26, 1995

§ 102(e) Date: May 26, 1995

[87] PCT Pub. No.: WO94/12900

PCT Pub. Date: Jun. 9, 1994

[30] Foreign Application Priority Data

Nov. 27, 1992 [DE] Germany ............... 92120327.9

[51] Int. Cl.⁶ .................................. G02B 6/38
[52] U.S. Cl. ................ 385/56; 385/60; 385/76; 385/136
[58] Field of Search ................ 385/76–78, 81, 385/84, 86–94, 136–139, 56, 58, 60

[56] References Cited

U.S. PATENT DOCUMENTS

| | | | |
|---|---|---|---|
| 4,362,898 | 12/1982 | Zendle et al. | 174/35 R |
| 4,804,244 | 2/1989 | Hasegawa et al. | 385/69 |
| 5,066,096 | 11/1991 | Krausse | 385/58 |
| 5,074,636 | 12/1991 | Hopper | 385/76 |
| 5,271,080 | 12/1993 | Hopper et al. | 385/76 |
| 5,315,684 | 5/1994 | Szegda | 385/139 |

FOREIGN PATENT DOCUMENTS

| | | |
|---|---|---|
| 0442056 | 8/1991 | European Pat. Off. |
| 0497463 | 8/1992 | European Pat. Off. |
| 9108708 | 11/1991 | Germany |

*Primary Examiner*—John D. Lee
*Attorney, Agent, or Firm*—Hill, Steadman & Simpson

[57] ABSTRACT

A backplane printed circuit board is metalized on its outer side with a shielding layer on which a metal body is applied over a large area, and the metal body has an aperture for the plug connection. A shielding sleeve, which covers over the plug parts of the plug connection in the manner of a cap, is screwed into the aperture of the metal body. Thus, the module frame is hence shielded against the penetration of interfering radiation.

17 Claims, 2 Drawing Sheets

RADIO FREQUENCY SHIELDING ARRANGEMENT FOR A PLUG WHICH HAS A LIGHT GUIDE AND CAN BE CONNECTED TO A MODULE FRAME

BACKGROUND OF THE INVENTION

The invention relates to a plug connection for a light guide which is connected to a plug having a centering pin which is plugged into a centering bush or sleeve of a holding body which is secured to a backplane printed circuit board of an electrical module frame, and the backplane printed circuit board is provided with free holes for the plug connection.

A plug connection of this type has been disclosed, for example, in DE 9010 866 U1. According to the latter, the plug has a union nut which can be screwed together with a threaded piece connected to the centering bush. The union nut extends from a central section of the plug to beyond the centering pin. The nut is knurled throughout for the purpose of manual actuation.

In modern broadband switching technology, it is normal to provide the backplane printed circuit boards with shielding layers over a large area for the purpose of shielding. Since the plug connection of the light guide must remain largely free from external forces, the plug connector parts are intended not to touch the backplane printed circuit board. Therefore, a gap exists between the shielding layer and the plug connector parts and the gap reduces the quality of the shielding, especially since the plug connector parts are not connected to ground.

SUMMARY OF THE INVENTION

The invention is based on the object of increasing the shielding reliability. This object is achieved by an improvement in a plug connection for a light guide, which is connected to a plug having a centering pin which is plugged into a centering sleeve of a holding body which is secured to a backplane printed circuit board of an electrical module frame on the module side, and the backplane printed circuit board is provided with a free hole for each plug connection. The improvements are that the backplane printed circuit board, on the side opposite the holding body, has an external shielding layer to which a metal body is secured so as to make contact over a large area, that the metal body is provided with an aperture for the plug connection, and that a metallic shielding sleeve which encloses the plug is secured circumferentially in the aperture. A large-area and intensive contact can be produced between the stable metal body and the external shielding layer, as a result of which the backplane printed circuit board is completely sealed along the shielding layer. The shielding sleeve can be connected to the metal body in a radio-frequency-tight manner, for example by means of screwing into the latter. It can be connected to the plug, for example by its other end, so as to give a contact, so that the gap between the plug and the shielding sleeve is sealed.

However, there is also the possibility of extending the shielding sleeve beyond the plug, as a result of which the gap between the shielding sleeve and the plug becomes so long that extensive shielding is achieved. The shielding sleeve, in this arrangement, can be designed such that it closely surrounds the plug and/or the incoming light guide, as a result of which forces acting laterally on the plug are intercepted and cannot influence the sensitive plug connection.

As a result of the development according to an embodiment in which the shielding sleeve projects beyond the plug on the side of the incoming light guide and a shielding sleeve covers the plug in the manner of a cap and has an end with a narrow opening for the sheathed light guide to pass through, virtually complete sealing is achieved between the plug parts and the shielding sleeve In this arrangement, the internal diameter of the shielding sleeve can be so large that the plug parts are not contacted, so that the plug connection remains uninfluenced by corresponding lateral forces.

As a result of the development according to another embodiment in which the shielding sleeve is designed as an essentially open cylindrical thin tube which, on the side facing the light guide, has spring tongues which are cut free by means of narrow longitudinal slits and rest on a smoothly surfaced contact section of the plug, it is possible to mount the shielding sleeve on the backplane printed circuit board before the insertion of the plug, in a suitable assembly stage, and subsequently to lead the plug for the light guide through the shielding sleeve, in order to insert the centering pin into the centering bush. The corresponding gap is then effectively sealed by means of the contacting spring tongues.

As a result of the development according to all embodiments which have a union nut which is screwed onto the centering sleeve and which has a contact section and an actuating section adjacent an end facing away from the metal body, contact surfaces are produced on the originally knurled union nut, in order to be able to contact said contact surfaces with the shielding sleeve.

As a result of the development according to all embodiments in which the union nut extends beyond the end of the plug which faces to the light guide, it is possible to be able to actuate the union nut in an easy to grasp manner, even if other plug connectors are arranged closely adjacent.

As a result of the development according all embodiments in which the shielding sleeve is threaded onto threads of the metal body, the shielding sleeve is secured in a radio-frequency-tight and stable manner to the metal body.

As a result of the development according to one embodiment in which a short contact sleeve having a laterally projecting collar is clamped between the metal body and the end of the shielding sleeve, and the contact sleeve rests with longitudinally extending spring fingers on a smoothly cylindrical contact section of the union nut, the gap between the plug and the metal body and/or the shielding sleeve is already reliably sealed in the vicinity of the shielding layer. As a result of the cylindrical configuration of the contact section, the spring fingers can be displaced with respect to the plug to such an extent that thickness differences of the backplane printed circuit board can be compensated.

As result of the development according to all embodiments in which the compact metal body has a small number of apertures for plug connections, it is possible to arrange the plug connections, as required, freely alongside or between other electrical plug connectors. In this arrangement, the free holes and the apertures in the metal body can be designed such that plug connections and/or coaxial plugs can be optionally accommodated.

As a result of the development according to all embodiments which have coincident holes in the metal body and the holding body, both the holding body and the metal body can be secured to the printed circuit board with the same screws. The projecting clamping pins already fix the holding body to the printed circuit board before screwing on, as a result of which assembly is facilitated.

As a result of the development according to all embodiments, the screws can be used without a mating thread. This is produced in the holding body, which consists of plastic, without a particular expenditure of force, for example by using screws with a self-tapping thread.

The lateral cheeks, which have the holes for the screws, can be produced without especial additional cost by means of corresponding shaping tools during injection molding of the holding body or by the use of extruded profiles in the case of the metal body, which consists, for example, of aluminum. The lateral cheeks increase the contact surface with the shielding layer and reduce the length of the holes for the holding screws.

DESCRIPTION OF THE PREFERRED EMBODIMENTS

Figure 1:
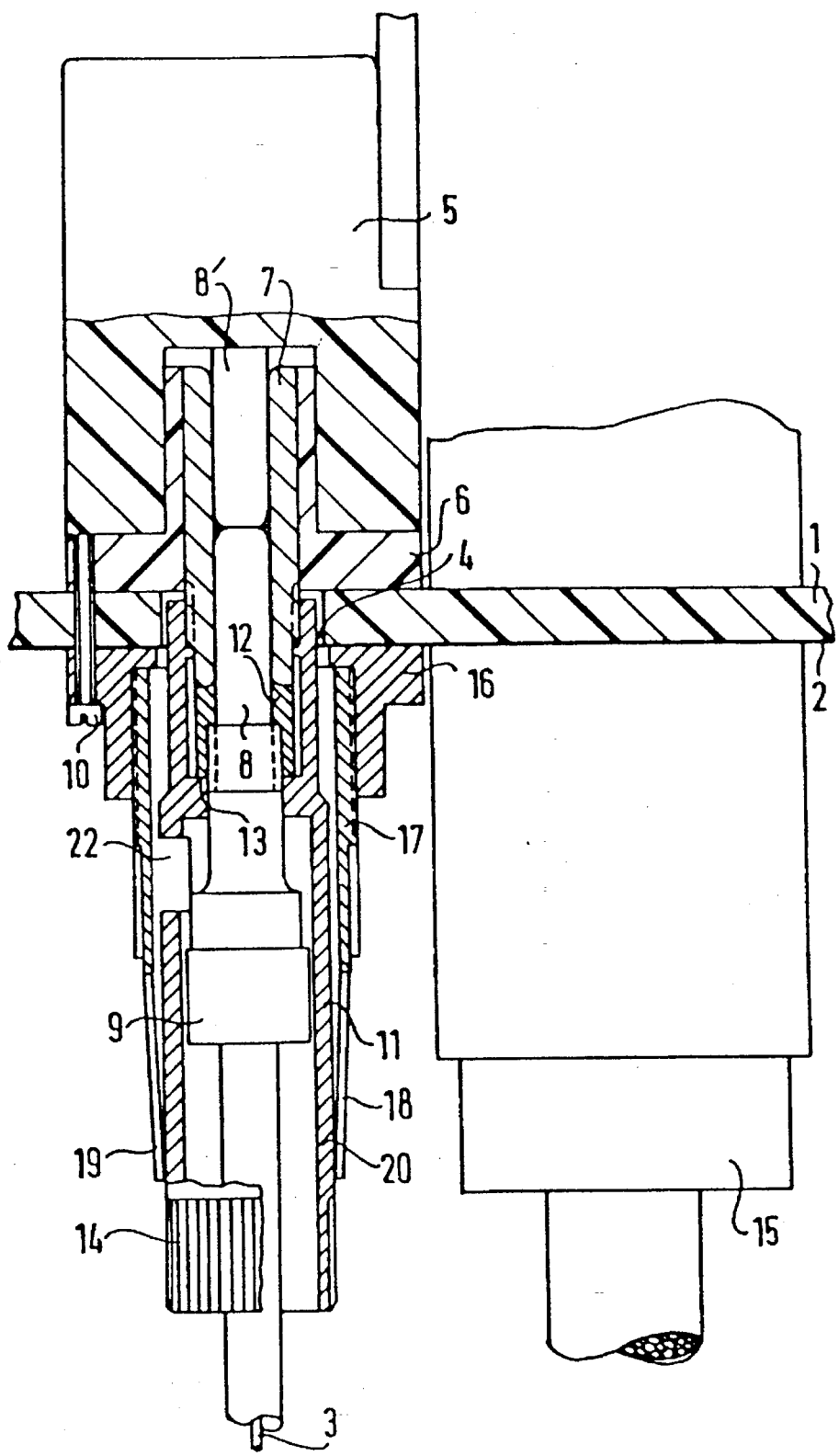
FIG. 1 shows in schematic form a longitudinal cross sectional view with portions in elevation through a plug connection for a light guide in the region of a backplane printed circuit board, having a tubular open shielding sleeve.

According to FIG. 1, a backplane printed circuit board 1 is provided with a large-area metallic shielding layer 2 and has a free hole 4 in the region of a plug connection for a light guide 3. Attached to said free hole 4, on the inner side, facing the modules 5, of the backplane printed circuit board 1 is a holding body 6 for a centering bush or sleeve 7 into which there projects a centering pin 8 of a plug 9 to which the sheathed light guide 3 is connected. A mating plug unit of the module 5 likewise has a centering pin 8, which, in the center of the centering bush 7 abuts at the end onto the centering pin 8 for the light guide 3 and is thus connected to said light guide 3.

The plug 9 is provided with a union nut 11 which abuts a screwed-on stop ring 12. Said union nut 11 has, at its end facing the module 5, an internal thread with which it can be screwed onto the external thread formed on the centering bush 7. As a result, the stop ring 12 of the plug 9 is axially braced between the centering bush 7 and a stop shoulder 13 of the union nut 11, as a result of which the plug 9 with the centering pin 8 is fixed to the centering bush 7.

Adjacent to the region of the stop ring 12, the union nut 11 is widened towards the light guide 3 to form a hollow cylindrical sleeve part whose internal diameter is greater than the greatest external diameter of the plug 9. The union nut 11 projects beyond the plug 9 and carries at its free end a hurled actuating section 14 which can easily be reached by hand, even in the close vicinity of an electrical cable plug 15 plugged onto the backplane printed circuit board 1.

On that side of the backplane printed circuit board 1 which faces away from the holding body 6, a metal body 16, preferably consisting of aluminum, is secured by means of screws 10 and is contacted by the shielding layer 2. A shielding sleeve 17 is pushed over the union nut 11 and screwed into an internal thread of the metal body 16. The free end of the shielding sleeve 17, which forms a contact part, is provided with narrow longitudinal slits 18, between which spring tongues 19 remain. The tongues 19 are bent towards the union nut 11 and rest on the nut 11 in a contact section 20 which is of smoothly cylindrical design and is located between the actuating section 14 and the stop ring 12. As a result, a close ground contact, which largely prevents the penetration of interfering radiation through the backplane printed circuit board 1, is produced between the shielding sleeve 17 and the union nut 11, which consists, for example, of brass or nickel silver.

Figure 2:
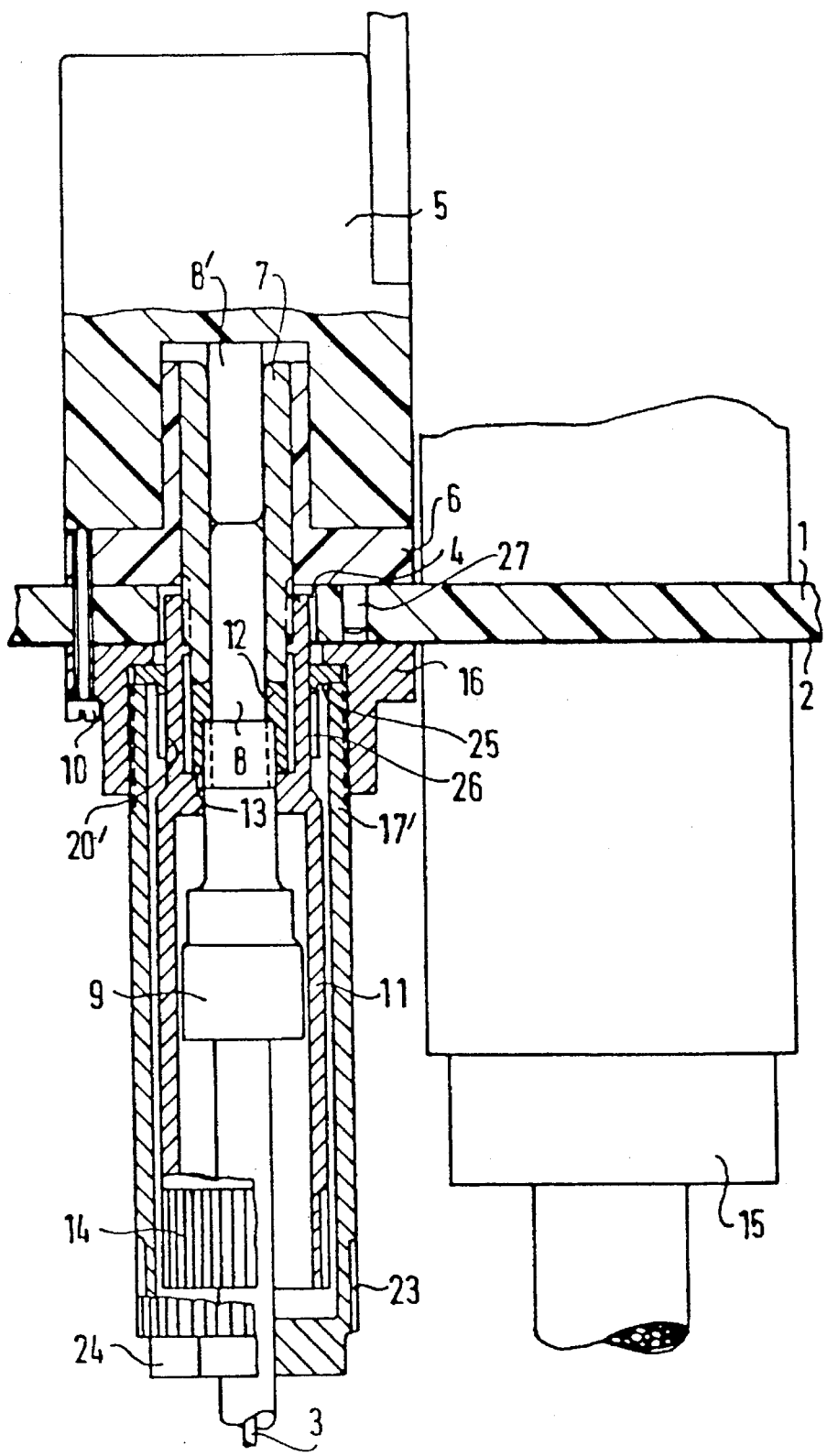
FIG. 2 shows a cross sectional view with portions in elevation of a modification of the connection of FIG. 1 with a cap-like closed shielding sleeve.

According to FIG. 2, the tubular open shielding sleeve 17 of FIG. 1 is substituted by a cap-like shielding sleeve 17' which is extended beyond the union nut 11 and exposes only a narrow opening for the penetrating sheathed light guide 3. The gap between the shielding sleeve 17' and the union nut 11 is so narrow and so long that effective shielding is already achieved. The shielding sleeve 17' has, at its free end, a freely accessible knurled grip surface 23 and, in addition, wrench surfaces 24 for the attachment of a corresponding tool.

On the other side of the shielding sleeve 17', between its end and a shoulder of the metal body 16, there is clamped a circumferential external collar of a contact sleeve 25 which rests with longitudinally extending spring fingers 26 on the union nut 11 which, in this contact section 20', is of a smoothly cylindrical design. As a result additional sealing is achieved between the union nut and the shielding sleeve 17'. The contact sleeve 25 can be longitudinally displaced on the union nut 11, so that thickness differences of the printed circuit board 1 can be compensated for without changing the contact properties.

The metal body 16 and the holding body 6 are provided with lateral web-like cheeks which enlarge the bearing surface with respect to the backplane printed circuit board 1. The thread-tapping screws 10 are arranged in this region and are screwed into holes of the holding body 6, which consists of plastic. Said holding body 6 has projecting clamping pins 27 which are pressed into corresponding clamping holes of the backplane printed circuit board 1 and fix the holding part 6 before screwing firmly to the backplane printed circuit board 1.

We claim:

1. A plug arrangement for a mating plug having a light guide which is connected to a centering pin of the mating plug, the plug arrangement having a holding body with a centering bush for the insertion of the centering pin, the holding body being secured to a backplane printed circuit board of an electrical module frame, on the module side, the backplane printed circuit board being provided with free holes for receiving plug connections, the improvements comprising the backplane printed circuit board, on the side opposite the holding body, having an external metallic shielding layer to which a metal body is secured so as to make contact over a large area, said metal body being provided with an aperture which is intended for the insertion of the mating plug and in which there is secured, in a radio-frequency-tight manner, a metallic shielding sleeve which encloses the inserted mating plug in such a manner that the modules are largely shielded against radio frequency.

2. A plug arrangement according to claim 1, wherein the shielding sleeve projects beyond the plug on the side of the incoming light guide and covers the plug over in the manner of a cap and has at an end of the sleeve a narrow opening for the sheathed light guide which passes through.

3. A plug arrangement according to claim 2, wherein a contact section is formed on a union nut which is screwed onto the centering sleeve, and wherein an actuating section of uneven surface is formed on that end of the union nut which faces away from the metal body.

4. A plug arrangement according to claim 3, wherein the union nut extends beyond that end of the plug which faces the light guide.

5. A plug arrangement according to claim 1, wherein the shielding sleeve is designed as an essentially open cylindrical thin tube which has, on the side facing the light guide, spring tongues which are cut free by means of narrow longitudinal slits and rest on a smooth surface of a contact section of the plug.

6. A plug arrangement according to claim 5, wherein the contact section is formed on a union nut which is screwed onto the centering sleeve, and wherein an actuating section of uneven surface is formed on that end of the union nut which faces away from the metal body.

7. A plug arrangement according to claim 6, wherein the union nut extends beyond that end of the plug which faces the light guide.

8. A plug arrangement according to claim 1, wherein the shielding sleeve is screwed into a thread of the metal body.

9. A plug arrangement according to claim 8, wherein a short contact sleeve having a laterally projecting collar is clamped between the metal body and the end of the shielding sleeve, and wherein the contact sleeve rests with longitudinally extending spring fingers on a smooth cylindrical contact section of a union nut.

10. A plug arrangement according to claim 1, wherein the metal body is assigned to a holding body.

11. A plug connection according to claim 10, wherein the holding body and the metal body are provided with coincident holes for penetrating screws, and wherein the holding body is held in corresponding clamping holes of the backplane printed circuit board by means of projecting clamping pins.

12. A plug arrangement according to claim 11, wherein the screws have a self-cutting thread which penetrates into the holding body, which consists of plastic.

13. A plug arrangement according to claim 12, wherein the holding body and the metal body have, on their side facing the backplane printed circuit board, lateral cheeks in which the holes for the screws are formed.

14. A plug arrangement according to claim 11, wherein the holding body and the metal body have, on their side facing the backplane printed circuit board, lateral cheeks in which the holes for the screws are formed.

15. A plug arrangement according to claim 1, wherein a contact section is formed on a union nut which is screwed onto the centering sleeve, and wherein an actuating section of uneven surface is formed on that end of the union nut which faces away from the metal body.

16. A plug arrangement according to claim 15, wherein the union nut extends beyond that end of the plug which faces the light guide.

17. A plug arrangement according to claim 1, which includes a module having a plug with a centering pin received in the centering sleeve to abut against the pin of the mating plug.

* * * * *